June 4, 1940.  R. C. COUPLAND  2,202,836
RATE MECHANISM
Filed April 4, 1939
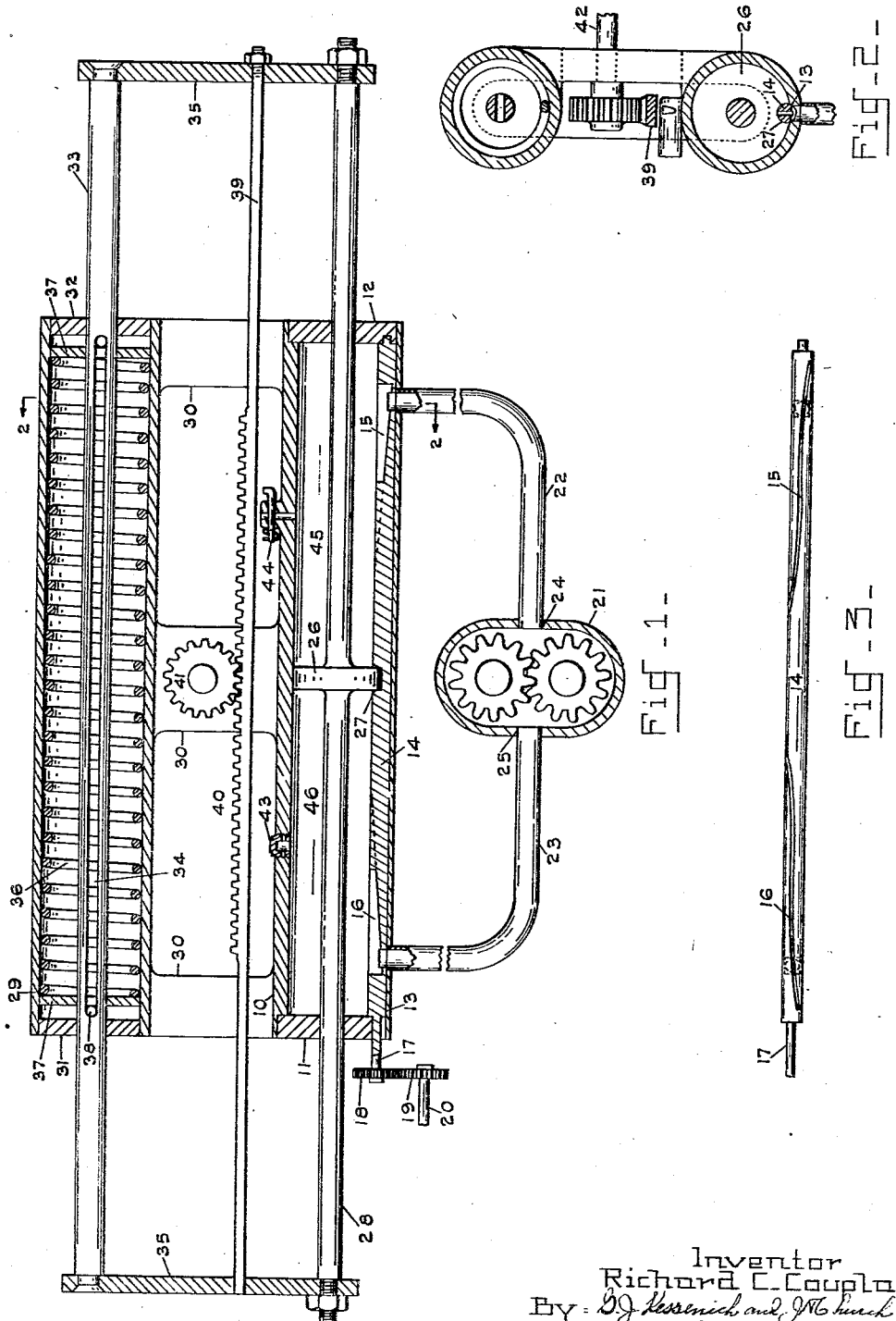
Inventor
Richard C. Coupland
By Kessenich and Church
Attorneys Patented June 4, 1940

2,202,836

UNITED STATES PATENT OFFICE 2,202,836

RATE MECHANISM

Richard C. Coupland, United States Army, Norfolk, Va.

Application April 4, 1939, Serial No. 265,997

5 Claims. (Cl. 264—14)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to a mechanism for determining the time rate of change of motion of a body moving in either a curved or straight path, and more particularly to a mechanism including an endless hydraulic circuit wherein a fluid is circulated in a volume time relation proportional to the speed of motion of the body to accordingly displace a piston or other suitable member in the circuit from a normal position. The rate mechanism of this invention is primarily applicable to ordnance and ordnance fire control equipment for automatically determining the speed of motion of a moving target by movement of a tracking instrument such as a gun or telescope but may be adapted with equal facility to many other applications such as a tachometer, speedometer, the speed measuring element of data computors for computing data based on the time rate of movement of a body or element and others that will be made apparent hereinafter.

One of the principal objects of this invention is to provide a rate mechanism that will respond to variations in rate of speed of motion of a body with which it is operatively associated in a uniformly accelerated manner, whereby the output of the mechanism will vary from rate to rate as a straight line function in distinction by contrast with the vibratory and jumping outputs of similar mechanisms sensitive to abrupt changes in acceleration of the body.

A further object of the invention is to provide a rate mechanism including an hydraulic circuit wherein exceedingly simple means are utilized to correct for changes in viscosity and friction head of the circulating fluid.

A still further object of the invention is to provide a rate mechanism including an hydraulic circuit adapted to be so controlled that the indicated rate of speed of motion of a body with which the mechanism is associated may be arbitrarily varied or combined with other data.

The specific nature of the invention as well as other objects and advantages thereof will clearly appear from a description of a preferred embodiment as shown in the accompanying drawing in which:

Fig. 1 is an elevation partially in section,

Fig. 2 is a section taken on the line 2—2 of Fig. 1, and

Fig. 3 is a fragmentary plan view showing a valve used in the mechanism.

Referring now to the drawing by characters of reference and more particularly to Fig. 1, the present embodiment of the invention is shown as comprising a cylinder 10 closed at its ends 11 and 12. The cylinder is longitudinally grooved from end to end to form a valve seat 13 of semi-circular cross section having its axis in the plane of the axis of the cylinder and opening on the interior of the cylinder for the purpose of receiving a valve 14 of general circular cross section and coextensive in length with the seat 13. The valve 14 is provided with ports 15 and 16 symmetric with reference to a transverse median line of the valve and cylinder and may be rotated in its seat 13 by means of the projection 17 extending without the end 11 of the cylinder through the medium of suitable driving means such as the gears 18, 19 and shaft 20 for a purpose to be more particularly described hereinafter. To avoid leakage of fluid between the valve 14 and its seat 13 the valve may be ground fit to its seat.

A pump 21 of any suitable type, but for convenience of illustration herein shown as an ordinary gear pump is placed in communication with the cylinder 10 by conduits 22 and 23 extending from the intake or discharge openings 24 or 25, as the case might be, in the pump casing to openings located in the cylinder 10 in proximity of its opposed ends and leading to the interior of the cylinder through the ports 15 and 16, respectively, to form an endless or closed passage through the cylinder, conduits, and pump for circulating a suitable fluid.

A piston 26 is disposed within the cylinder 10 in substantially fluid tight relation relative to the walls of the cylinder and is provided with a cut away portion 27 of arcuate shape extending inwardly from its periphery adapted to engage or be sealed in fluid tight relation with the portion of valve 14 lying between ports 15 and 16. Secured to the piston 26 and extending outwardly from either side thereof axially of the cylinder through the ends 11 and 12 of the cylinder are piston rods 28 adapted to be secured to any suitable means for normally maintaining the piston in a neutral central position within the cylinder and transmitting movement of the piston to a desired device or mechanism.

In the embodiment of the invention herein disclosed the means for restraining the piston 26 in a normal neutral position are preferably external of the cylinder 10 and comprise a cylinder 29 secured by standards or brackets 30 to the cylinder 10 in parallel relation therewith although it will be understood that cylinder 29 may be disposed in axial prolongation of cylinder 10 if desired. The cylinder 29 may be closed at its ends as indicated by the elements 31 and 32 which may also serve as bearings for the axially movable rod 33. The rod 33 is of such length that in its normal position its ends will lie in substantial alignment with the corresponding ends of the piston rods 28 and is connected to the latter by similar yokes 35. To bias the rod 33 toward its normal neutral position a compression spring 36 is disposed within the cylinder 29 about the rod 33 and between opposed spring seats 37 carried by the rod. The rod 33 is slotted as indicated at 34 and the spring seats 37 are secured to the rod for relative movement with respect thereto and to each other but are limited in outward relative movement by limiting pins 38 interposed between the outer sides of the spring seats and termini of the slot 34, the length of the latter being so chosen that the spring 36 will be under slight initial compression in the neutral position of the rod.

For conveniently transmitting the motion of piston 26 and piston rods 28 to a desired point a rack bar 39 is extended between the yokes 35 to carry a rack 40 in driving engagement with a pinion 41 suitably keyed to a transmission shaft 42 journaled in the central standard or bracket 30 for rotation. The transmission shaft 42 may be connected with any suitable indicating mechanism or with other mechanism for moving a desired element or device in accordance with the displacement of the piston 26.

In operation of the device the cylinder 10, conduit 22, pump casing, and conduit 23 are first filled with some fluid preferably of a relatively incompressible nature such as oil, through the filling opening normally closed by plug 43, and owing to the restrictions in the hydraulic circuit due to the ports 15 and 16 and pump the filling operation is expedited by forcing the fluid into the circuit under pressure and during such operation air is permitted to escape from the circuit through the valve 44. After the circuit is completely filled with fluid the valve 44 is closed and the filling plug 43 replaced. One of the gears of the gear pump 21 is now secured in any desired manner in driven relation with the body whose time rate of change in motion it is desired to measure or transmit to another body or station. The pump 21 may be so driven that either opening 24 or 25 constitutes the discharge outlet for the pump but for the purpose of illustration let it be assumed that opening 24 is the discharge outlet in this particular instance, then upon rotation of the gears of the pump, oil entering the pump casing through conduit 23 and inlet 25 on the recession side of the gears is carried around the spaces between the teeth of the gears to the discharge outlet 24 in a well known manner and forced through conduit 22 into the cylinder 10 through port 15 between piston 26 and end 12 of the cylinder to increase the volume of fluid in the chamber 45 and decrease the volume of fluid in the chamber 46 between the piston 26 and end 11 of cylinder 10 correspondingly. Increase of the volume of fluid in chamber 45 with accompanying corresponding decrease of the volume of fluid in chamber 46 will result in displacement of the piston 26 from its normal central neutral position to the left as viewed in Fig. 1, and this displacement is so interrelated with the pump capacity, volumes of the chambers 45 and 46 and shape and location of the ports 15 and 16, that the minimum displacement of the piston 26 that it is desired to utilize will ensure uncovering of the portion 27 in piston 26 by one or the other of ports 15 or 16, in this particular illustration port 16, to form a passage from chamber 45. As previously described the ports 15 and 16 are symmetric with respect to a transverse median line of the valve and each port comprises a pair of parallel side walls joined by a bottom wall extending from the peripheral surface of the valve at its inner terminus outwardly in inwardly inclined relation to the axis of the valve as shown in Fig. 1. At their outer termini the ports are of greatest cross-sectional area and are in communication with the conduits 22 and 23, respectively. As will be noted by inspection of Fig. 1 the valve may be rotated to throttle or decrease the area of the conduit outlets communicating with the interior of cylinder 10. In this manner a valve is provided which has ports that cooperate with various positions of the piston 26 when displaced to a position thereover to provide a by-pass leading from one side of the piston to the other of variable cross-section depending upon the position of the piston and its cut away port 27 with respect to the port 15 or 16. Also the valve may be rotated to throttle conduits 22 and 23 for the purpose of introducing arbitrary corrections. To insure that rotation of the valve in its seat will not rotate the ports from a position with their open side establishing communication from one side of the piston to the other, the ports are formed on a spiral curve on the valve. With ports arranged as herein described, the by-pass leading from one side of the piston to the other when the piston is displaced over a port will be varied in cross-sectional area and serve to maintain the ratio of increased resistance of the spring 36 and friction head on the fluid constant with outward displacement of the valve constant position where the size of the passage through piston 26 and port 16 is sufficient to permit the escape of fluid from chamber 45 to chamber 46 at the same rate that it is admitted to chamber 45 a state of equilibrium will be established and the displacement of the piston 26 will be proportional to the speed at which the pump 21 is driven which is also proportional to the time rate of change of motion of the body which drives the pump. Displacement of piston 26 results in displacement of rack 40 and pinion 41 to rotate shaft 42 which may be attached to an indicator needle derangeable over a graduated dial or directly attached to any element to be displaced in accordance with the time rate of change of the body to which the pump is attached.

The valve 14 may be rotated by the shaft 20 and gears 18 and 19 to reduce the area of the openings leading from the conduits 22 and 23 into the ports 15 and 16, respectively, to make corrections for changes in viscosity of the fluid or to otherwise regulate the pressure and to alter the relation between the cut-away portion 27 in the piston 26 and ports 15 and 16 to incorporate arbitrary or other desired data with the time rate of change of the body actuating the pump.

Upon cessation of movement of the body to which the pump 21 is attached or upon disengagement of the driving relation therebetween the pump will discontinue the circulation of the fluid and the compression spring 36 will be free to expand from its compressed state as effected by the displacement of piston 26 to restore the piston 26 to its normal central position thereby equalizing the volumes of fluid in the circuit on either side of the piston and conditioning the device for further operation.

In view of the hydraulic connection between the relative displaceable parts of the mechanism and the ability of the fluid to absorb sudden shocks the operation of the device is relative gradual in exhibiting sudden changes in rate of motion of the body driving the mechanism.

Having now particularly described my invention in its present preferred embodiment, what I claim as new and desire to secure by Letters Patent is:

I claim:

1. A rate mechanism comprising in combination, a cylinder interiorly grooved longitudinally to provide a valve seat and closed at both ends, an elongated valve provided with ports at either end portion rotatably positioned in the valve seat, a piston disposed within said cylinder in sealed relation to the cylinder walls and valve and reciprocable to a position over either port for establishing communication past the piston, means normally restraining the piston to a position between said ports, a pump operable in accordance with the time rate of change in motion of a body, conduits adapted to be throttled by rotation of the valve leading from the intake and discharge of said pump to the interior of the cylinder through said ports, and transmission means operatively connected to said piston for displacement therewith.

2. A rate mechanism comprising in combination, a cylinder interiorly grooved longitudinally to provide a valve seat of arcuate shape in cross section and closed at both ends, an elongated valve rotatably disposed within said seat and provided at either end with generally longitudinal extending ports symmetric about its transverse median line, means for rotating said valve in its seat, a piston disposed within said cylinder in sealed relation to the cylinder walls and valve and reciprocable to a position over either ported end portion of the valve for establishing communication by-passing the piston, means normally restraining the piston to a position between said ports, a pump operable in accordance with the time rate of change in motion of a body, conduits leading from the intake and discharge of said pump to the interior of the cylinder through said ports, said conduits being adapted to be throttled by rotation of the valve and transmission means operatively connected to said piston for displacement therewith.

3. A rate mechanism comprising in combination, a cylinder interiorly grooved longitudinally to provide a valve seat of semi-circular shape in cross section and closed at both ends, an elongated valve of general circular section fitted within said valve seat in fluid sealed relation and provided with longitudinally extending ports of outward increasing cross sectional area at either end portion symmetric about its transverse median line, means for rotating said valve in its seat, a piston disposed within said cylinder in sealed relation thereto and being cut-away to fit said valve in fluid sealed relation and reciprocable to variable positions over either ported end portion of the valve, means normally restraining the piston to a position between said ports, a pump operable in accordance with the time rate of change in motion of a body, conduits leading from the intake and discharge of said pump to the ports in said valve and being adapted to be throttled by rotation of the valve, and transmission means operatively connected to said piston for displacement therewith.

4. In a rate mechanism in combination, means including a cylinder forming an endless passage adapted to be filled with fluid, means for circulating fluid in said passage, a piston disposed in the cylinder and having piston rods secured thereto extending without either end of the cylinder, means in said cylinder cooperating with the piston to form a by-pass around the piston in certain positions of the latter, a second cylinder provided with axially aligned supports in its ends secured to said first named cylinder in parallel relation, a rod extended through the supports and having its ends in substantial alignment with the free ends of the piston rods in normal position of the rod and piston, said rod being formed to provide a longitudinal slot extending between the supports when in normal position, spring seats carried by said rod, limiting pins inserted through said slots between the spring seats and supports, a compression spring surrounding the rod and holding the spring seats against the limiting pins, and yokes connecting the free ends of the piston rods with the ends of the rod.

5. The structure of claim 4 wherein a rack is secured to said yokes for movement therewith and a pinion is supported by said cylinders in engaging relation with the rack.

RICHARD C. COUPLAND.